Patented Mar. 2, 1937

2,072,247

UNITED STATES PATENT OFFICE 2,072,247

PROCESS FOR THE PRODUCTION OF METHYLAMINE

Henry Dreyfus, London, England

No Drawing. Application February 11, 1933, Serial No. 656,365. In Great Britain March 9, 1932

13 Claims. (Cl. 260—127)

This invention relates to the production of methylamines from hydrogen cyanide.

According to the invention methylamines are produced by subjecting hydrogen cyanide to treatment with hydrogen in the presence of catalysts consisting of or comprising cyanides of "hydrogenating" metals i. e. metals capable of acting as hydrogenating catalysts, for example, nickel, copper, zinc.

The catalysts to be employed for the purposes of the invention may, if desired, comprise besides one or more of the said cyanides, one or more hydrogenating metals in the free state and/or one or more alkali or earth alkali cyanides.

In carrying out the process of the invention the catalysts may be used in any convenient form, for example spread or precipitated upon suitable carriers, such for instance as pumice, "carborundum", kieselguhr or the like.

The production of the methylamines may be effected by passing the mixture comprising hydrogen cyanide and hydrogen through fireclay, fused silica, copper or other tubes, or other forms of apparatus containing the catalysts and heated to the desired temperatures, e. g. electrically.

The invention is not limited to the employment of pure hydrogen and hydrogen cyanide and the mixture comprising the two reactants may of course be produced in any convenient or desired manner. For example, gaseous hydrogen cyanide may be simply mixed with hydrogen or a gas mixture containing hydrogen in the desired proportions, or, for example, a current of hydrogen or a gas containing hydrogen may be passed in a regulated stream over or through liquefied hydrogen cyanide and the resultant gas mixture subjected to the reaction.

The proportion of hydrogen to hydrogen cyanide may vary within wide limits, but when monomethylamine is to be produced as sole or main reaction product mixtures comprising hydrogen and hydrogen cyanide containing a considerable proportion of hydrogen, for example, 12 to 16 volumes or more of hydrogen to 1 volume of hydrogen cyanide are preferably employed. Lower proportions of hydrogen should be employed when more di- and tri-methylamine and less monomethylamine is required in the reaction product.

The reaction product may be treated in any desired manner to recover the methylamines. For example, the gaseous product may be absorbed in dilute hydrochloric acid.

In carrying out the process temperatures of between about 150–500° C. may be employed with advantage and especially temperatures of about 200 to 350° C. The reaction may be carried out under super-atmospheric pressure, ordinary pressure or under reduced pressure.

A convenient method of carrying out the process of the invention comprises passing a current of hydrogen over or through liquid hydrogen cyanide in such manner as to give a mixture of hydrogen cyanide and hydrogen containing about 94% by volume of hydrogen. The mixture is then passed through the reaction vessel (e. g. a copper tube) containing the catalyst (such for instance as nickel or copper cyanide spread or deposited upon pumice) and the issuing reaction vapors may be washed with dilute acid (e. g. hydrochloric acid) to absorb the methylamines which may subsequently be isolated in any convenient manner.

The gases after being washed or otherwise treated for the removal of the methylamine may be dried (e. g. by passing in contact with concentrated sulphuric acid) and returned to the vaporizer for recirculation through the apparatus.

Before being subjected to reaction the mixture of hydrogen and hydrogen cyanide (or either, or both, separately) may be preheated. If desired this may be effected, partly or wholly, by heat exchange with the gases and vapors issuing from the reaction zone.

The following example illustrates the invention, but it is to be understood that the invention is in no way limited thereto:—

*Example*

Into a stream of hydrogen preheated to 100° C. hydrogen cyanide is sprayed at a rate of 56 grams per cubic metre of hydrogen. The resulting mixture is passed in a rapid stream into contact with a catalyst contained in a reaction tube maintained at a temperature of 275 to 280° C. The catalyst is produced by depositing nickel oxide upon pumice, reducing the product with hydrogen and then precipitating nickel cyanide upon it.

The gases issuing from the tube are cooled by heat exchange with the fresh hydrogen being supplied to the tube and are then fed into a tower, maintained at room temperature, in which they are scrubbed with dilute hydrochloric acid to absorb the reaction products which consist mainly of monomethylamine together with small quantities of dimethylamine, and tri-methylamine and some ammonia. The residual hydrogen, after drying, can be re-used in the process.

What I claim and desire to secure by Letters Patent is:—

1. Process for the manufacture of methylamine which comprises subjecting a mixture of hydrogen and hydrogen cyanide to reaction in the vapor phase in presence of a cyanide of a hydrogenating metal.

2. Process for the manufacture of methylamine which comprises subjecting a mixture of hydrogen and hydrogen cyanide to reaction in the vapor phase in presence of a cyanide of a hydrogenating metal and a cyanide of a metal at least as electro-positive as calcium.

3. Process for the manufacture of methylamine which comprises subjecting a mixture of hydrogen cyanide and hydrogen to reaction in the vapor phase in presence of a cyanide of a hydrogenating metal selected from the group consisting of nickel, copper and zinc.

4. Process for the manufacture of methylamine which comprises subjecting a mixture of hydrogen cyanide and hydrogen to reaction in the vapor phase in presence of a cyanide of a hydrogenating metal and a free hydrogenating metal.

5. Process for the manufacture of methylamine which comprises subjecting a mixture of hydrogen cyanide and hydrogen to reaction in the vapor phase in presence of a cyanide of a hydrogenating metal and a free hydrogenating metal, the hydrogenating metal being selected from the group consisting of nickel, copper and zinc.

6. Process according to claim 5, wherein a cyanide of a metal at least as electro-positive as calcium is also present.

7. Process for the manufacture of methylamine which comprises subjecting a mixture of hydrogen cyanide and hydrogen to reaction in the vapor phase at temperatures of 150 to 500° C. in presence of a cyanide of a hydrogenating metal.

8. Process for the manufacture of methylamine which comprises subjecting a mixture of hydrogen cyanide and hydrogen to reaction in the vapor phase at temperatures of 200 to 350° C. in presence of a cyanide of a hydrogenating metal.

9. Process for the manufacture of methylamine which comprises subjecting a mixture of hydrogen cyanide and hydrogen to reaction in the vapor phase at temperatures of 200 to 350° C. in presence of a cyanide of a hydrogenating metal selected from the group consisting of nickel, copper and zinc.

10. Process for the manufacture of methylamine which comprises subjecting a mixture of hydrogen cyanide and hydrogen to reaction in the vapor phase at temperatures of 200 to 350° C. in presence of a cyanide of a hydrogenating metal and a free hydrogenating metal.

11. Process for the manufacture of methylamine which comprises subjecting a mixture of hydrogen cyanide and 12 to 16 times its volume of hydrogen to reaction in the vapor phase in presence of a cyanide of a hydrogenating metal.

12. Process for the manufacture of methylamine which comprises subjecting a mixture of hydrogen cyanide and 12 to 16 times its volume of hydrogen to reaction in the vapor phase in presence of a cyanide of a hydrogenating metal and a free hydrogenating metal, the hydrogenating metal being selected from the group consisting of nickel, copper and zinc.

13. Process for the manufacture of methylamine which comprises subjecting a mixture of hydrogen cyanide and 12 to 16 times its volume of hydrogen to reaction in the vapor phase at temperatures of 200 to 350° C. in presence of a cyanide of a hydrogenating metal being selected from the group consisting of nickel, copper and zinc.

HENRY DREYFUS.